Patented Aug. 7, 1945

2,381,384

UNITED STATES PATENT OFFICE 2,381,384

VULCANIZATION ACCELERATOR

Edward L. Carr, Akron, Ohio, assignor to The Firestone Tire & Rubber Company, Akron, Ohio, a corporation of Ohio No Drawing. Application September 20, 1941, Serial No. 411,719

8 Claims. (Cl. 260—788)

This invention relates to the vulcanization of rubber, and relates especially to a new class of chemical compounds which are valuable accelerators for the vulcanization of rubber or rubber-like substances.

It is a primary object of the present invention to provide a new class of accelerators for the vulcanization of natural or synthetic rubber.

Another object is to provide a new group of delayed action rubber vulcanization accelerators.

Another object is to provide a rapid method of vulcanizing rubber at customary vulcanizing temperatures.

A further object is to provide vulcanized rubber of improved quality, possessing the characteristics of high modulus and tensile, low hysteresis and a high inherent resistance to deterioration by flexing or aging.

The above and further objects will be manifest in the description of the invention which follows.

It has been found that members of a new class of chemical compounds are very effective in accelerating the vulcanization of natural or synthetic rubber. The new compounds may be conveniently prepared by oxidizing a mixture of an aromatic 2-mercaptothiazole and an hydroxyalkyl primary amine. The preparative oxidation reaction may be carried out by treating a mixture of the mercaptothiazole and an excess of the amine in an alkaline aqueous medium with one of the following oxidizing agents: chlorine, bromine, iodine, hypochlorous acid, hypobromous acid, hypoiodous acid, and alkali metal and alkaline earth metal salts of said acids. The oxidation reaction is believed to comprise the direct action of a hypohalous acid, or an alkali metal or an alkaline earth metal salt thereof, on a mixture of the mercaptothiazole and one equivalent of the amine. The desired substances produced by this oxidation reaction are organic compounds containing nitrogen, sulfur and oxygen.

This new class of accelerators is believed to possess the following type formula:

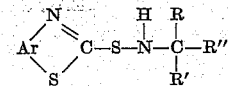

wherein Ar is an orthoarylene radical, R and R' are hydrogen, alkyl or hydroxyalkyl radicals and R" is an hydroxyalkyl radical. Thus, the new compounds are considered to be derivatives of sulfenamide (HSNH$_2$). Examples of orthoarylene radicals comprise benzo, 4-phenylbenzo, 6-phenylbenzo, naphtho, and homologs or the various ring substitution products of these radicals; as typical ring substituents there may be mentioned nitro, halogen, hydroxy and alkoxy groups. Examples of alkyl radicals include methyl, ethyl, propyl, butyl, amyl, hexyl, heptyl, octyl and similar radicals. Examples of hydroxyalkyl radicals include hydroxymethyl, alpha-hydroxyethyl, beta-hydroxyethyl and similar radicals.

The following specific example is given in further illustration of the invention.

Example

A solution was prepared containing 10 grams of mercaptobenzothiazole, 4.8 grams of sodium hydroxide and 7 grams of ethanolamine in a volume of 350 cubic centimeters. Into this solution, at room temperature, there was slowly dropped, with stirring, an iodine solution containing 15 grams of iodine and 15 grams of potassium iodide in a volume of 150 cubic centimeters. A white solid precipitated during the addition of the iodine solution. After the completion of the addition of the iodine solution the solid product was separated and recrystallized from a mixture of ether and petroleum ether. The white, recrystallized product melted at 98–99° C. The product, so produced, is believed to be N-(beta-hydroxyethyl)-2-benzothiazyl sulfenamide of the following formula:

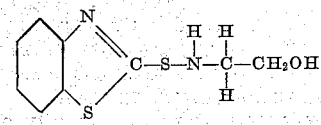

The above reaction product was tested as a rubber vulcanization accelerator by comparing it with the standard accelerator, mercaptobenzothiazole, in the following rubber formula:

| Ingredients | Parts by weight |
|---|---|
| Rubber (smoked sheets) | 100.00 |
| Sulfur | 3.00 |
| Zinc oxide | 5.00 |
| Stearic acid | 1.10 |
| Accelerator | 0.75 |
| | 109.85 |

The two rubber compositions, so formulated, were vulcanized by being heated at 280° F. for 20, 30 and 60 minutes, and the following physical data were obtained on the vulcanized compositions:

| Accelerator | Modulus of elasticity in lbs./in.² at elongation of 600% | | | Tensile strength in lbs./in.² at break | | |
|---|---|---|---|---|---|---|
| | Cure in minutes | | | | | |
| | 20 | 30 | 60 | 20 | 30 | 60 |
| Mercaptobenzothiazole | 700 | 700 | 750 | 2,425 | 2,550 | 2,675 |
| N-(beta-hydroxyethyl)-2-benzothiazyl sulfenamide | 1,575 | 1,700 | 1,550 | 3,450 | 3,075 | 3,350 |

The above results clearly show that the sulfenamide derivative is a very effective rubber accelerator, which imparts consistently higher modulus and tensile characteristics to a rubber composition than does the standard accelerator, mercaptobenzothiazole. Similar results are obtained by the use of other sulfenamide derivatives of the same class, such as N-(alpha,alpha-dimethyl-beta-hydroxyethyl)-2-benzothiazyl sulfenamide of the formula

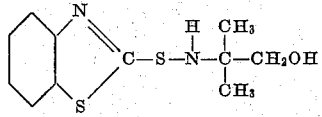

and N-[alpha-methyl-alpha-(hydroxymethyl)-beta-hydroxyethyl]-2-benzothiazyl sulfenamide of the formula

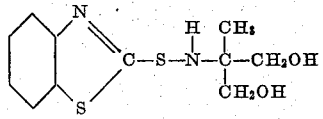

These two derivatives may be prepared by applying the general oxidation reaction mentioned above, respectively, to a mixture of mercaptobenzothiazole with 2-amino-2-methyl-1-propanol and to a mixture of mercaptobenzothiazole with 2-amino-2-methyl-1,3-propandiol.

The preferred class of sulfenamide derivatives may be prepared by other methods than those mentioned hereinabove, as will be apparent to one skilled in the art. For example, a mixture of an aromatic 2-mercaptothiazole and an hydroxyalkyl primary amine may be oxidized by hydrogen peroxide or other conventional oxidizing agent. The invention is not limited to derivatives prepared in accordance with any particular method, but includes the preferred class of accelerators, however they may have been manufactured.

The new accelerators are equally effective in rubber tire tread compositions, latex compositions and vulcanizable synthetic rubber compositions, particularly in the "Buna" types of synthetic rubber. The new derivatives not only impart high modulus and tensile characteristics to rubber compositions vulcanized in their presence, but also excellent resistance to deterioration on aging or flexing and low hysteresis properties. Although the new accelerators cause rapid vulcanization of rubber compositions at usual vulcanizing temperatures, they are of the delayed action type and do not cause set-up or pre-vulcanization of the rubber under ordinary processing conditions and temperatures. Moreover, the new class of accelerators may be used in combination with other accelerators, such as a guanidine (e. g., diphenylguanidine) or a mercaptothiazole derivative (e. g., mercaptobenzothiazole or dibenzothiazyl disulfide) in order to produce rubber compositions having special vulcanization characteristics, such as the ability to vulcanize completely at abnormally low temperatures.

Although sulfur has been given as the only example of a vulcanizing agent, other known vulcanizing agents may be used in the present method of vulcanizing rubber.

What is claimed is:

1. The method of vulcanizing rubber which comprises heating rubber and sulfur in the presence of N-(beta-hydroxyethyl)-2-benzothiazyl sulfenamide.

2. The method of vulcanizing rubber which comprises heating rubber and sulfur in the presence of N-(alpha,alpha-dimethyl-beta-hydroxyethyl)-2-benzothiazyl sulfenamide.

3. The method of vulcanizing rubber which comprises heating rubber and sulfur in the presence of N-[alpha-methyl-alpha-(hydroxymethyl)beta-hydroxyethyl]-2-benzothiazyl sulfenamide.

4. The method of vulcanizing rubber which comprises heating rubber and a vulcanizing agent in the presence of a compound having the formula

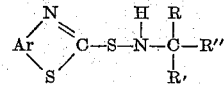

wherein Ar is an orthoarylene radical, R and R' are selected from the group consisting of hydrogen, alkyl radicals and hydroxyalkyl radicals, and R" is an hydroxyalkyl radical.

5. A vulcanized rubber product prepared by heating rubber and sulfur in the presence of N-(beta-hydroxyethyl)-2-benzothiazyl sulfenamide.

6. A vulcanized rubber product prepared by heating rubber and sulfur in the presence of N-(alpha,alpha-dimethyl-beta-hydroxyethyl)-2-benzothiazyl sulfenamide.

7. A vulcanized rubber product prepared by heating rubber and sulfur in the presence of N-[alpha-methyl-alpha-(hydroxymethyl)-beta-hydroxyethyl]-2-benzothiazyl sulfenamide.

8. A vulcanized rubber product prepared by heating rubber and a vulcanizing agent in the presence of a compound having the formula

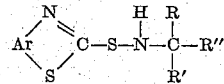

wherein Ar is an orthoarylene radical, R and R' are selected from the group consisting of hydrogen, alkyl radicals and hydroxyalkyl radicals, and R" is an hydroxyalkyl radical.

EDWARD L. CARR.